US010189734B2

(12) United States Patent
Nadon

(10) Patent No.: US 10,189,734 B2
(45) Date of Patent: Jan. 29, 2019

(54) FLOATING METHANATION SYSTEM

(71) Applicant: Gilles Nadon, Beauharnois (CA)

(72) Inventor: Gilles Nadon, Beauharnois (CA)

( * ) Notice: Subject to any disclaimer, the term of this patent is extended or adjusted under 35 U.S.C. 154(b) by 247 days.

(21) Appl. No.: 14/967,277

(22) Filed: Dec. 12, 2015

(65) Prior Publication Data

US 2016/0168000 A1 Jun. 16, 2016

(30) Foreign Application Priority Data

Dec. 16, 2014 (CA) ..................................... 2875345

(51) Int. Cl.
| | | |
|---|---|---|
| C02F 1/00 | (2006.01) | |
| C02F 11/04 | (2006.01) | |
| C05F 7/00 | (2006.01) | |
| F17D 1/00 | (2006.01) | |
| F17D 3/00 | (2006.01) | |
| F28F 19/00 | (2006.01) | |
| E03C 1/266 | (2006.01) | |
| F28D 1/06 | (2006.01) | |
| F28D 21/00 | (2006.01) | |
| F28D 1/02 | (2006.01) | |

(52) U.S. Cl.
CPC ................ *C02F 11/04* (2013.01); *C05F 7/00* (2013.01); *E03C 1/2665* (2013.01); *F17D 1/005* (2013.01); *F17D 3/00* (2013.01); *F28D 1/022* (2013.01); *F28D 1/0213* (2013.01); *F28D 1/06* (2013.01); *F28D 21/0012* (2013.01); *F28F 19/008* (2013.01); *C02F 2203/006* (2013.01); *Y02E 50/343* (2013.01); *Y02W 30/47* (2015.05)

(58) Field of Classification Search
USPC ......... 435/289.1, 290.8, 297.3; 210/605, 613
See application file for complete search history.

(56) References Cited

U.S. PATENT DOCUMENTS

| 8,992,772 B2* | 3/2015 | Kaw | C02F 3/06 210/150 |
|---|---|---|---|
| 2008/0178739 A1* | 7/2008 | Lewnard | B01D 53/84 95/186 |
| 2009/0049748 A1* | 2/2009 | Day | C01B 3/342 48/77 |

(Continued)

FOREIGN PATENT DOCUMENTS

WO WO 2015164444 * 10/2015

*Primary Examiner* — Nina Bhat

(57) ABSTRACT

An apparatus for the treatment and transformation of municipal wastewater sludge or any other organic putrescible matter into biogas and liquid fertilizer by methanation. Several consecutive floating cylindrical bioreactors almost totally immersed in water, are bathing longitudinally in a thermally insulated basin to maintain set temperatures, mixing their contents by revolving on themselves by the action of air ejected from a conduit underneath them, engaging all elements in a collective momentum, from a multiplied force, because of the constant free power of each air bubble lodged in exterior buckets and grouped as a lifting force. The gas produced by methanation of the organic waste furnishes a source of heat and its pressure is used for the functioning of the whole apparatus, including several types of pumps, valves, and a new model of steam engine. A network of hoses is provided to bring the fertilizer to the farmlands.

13 Claims, 19 Drawing Sheets

(56) References Cited

U.S. PATENT DOCUMENTS

| | | | |
|---|---|---|---|
| 2011/0217764 A1* | 9/2011 | Christenson | C12M 1/10 435/289.1 |
| 2012/0021477 A1* | 1/2012 | Bernard | B01D 53/62 435/167 |
| 2014/0011246 A1* | 1/2014 | Sims | C12P 7/649 435/134 |
| 2014/0083937 A1* | 3/2014 | Hsu | C02F 1/24 210/610 |
| 2016/0002582 A1* | 1/2016 | Lin | C12M 23/52 435/294.1 |

\* cited by examiner

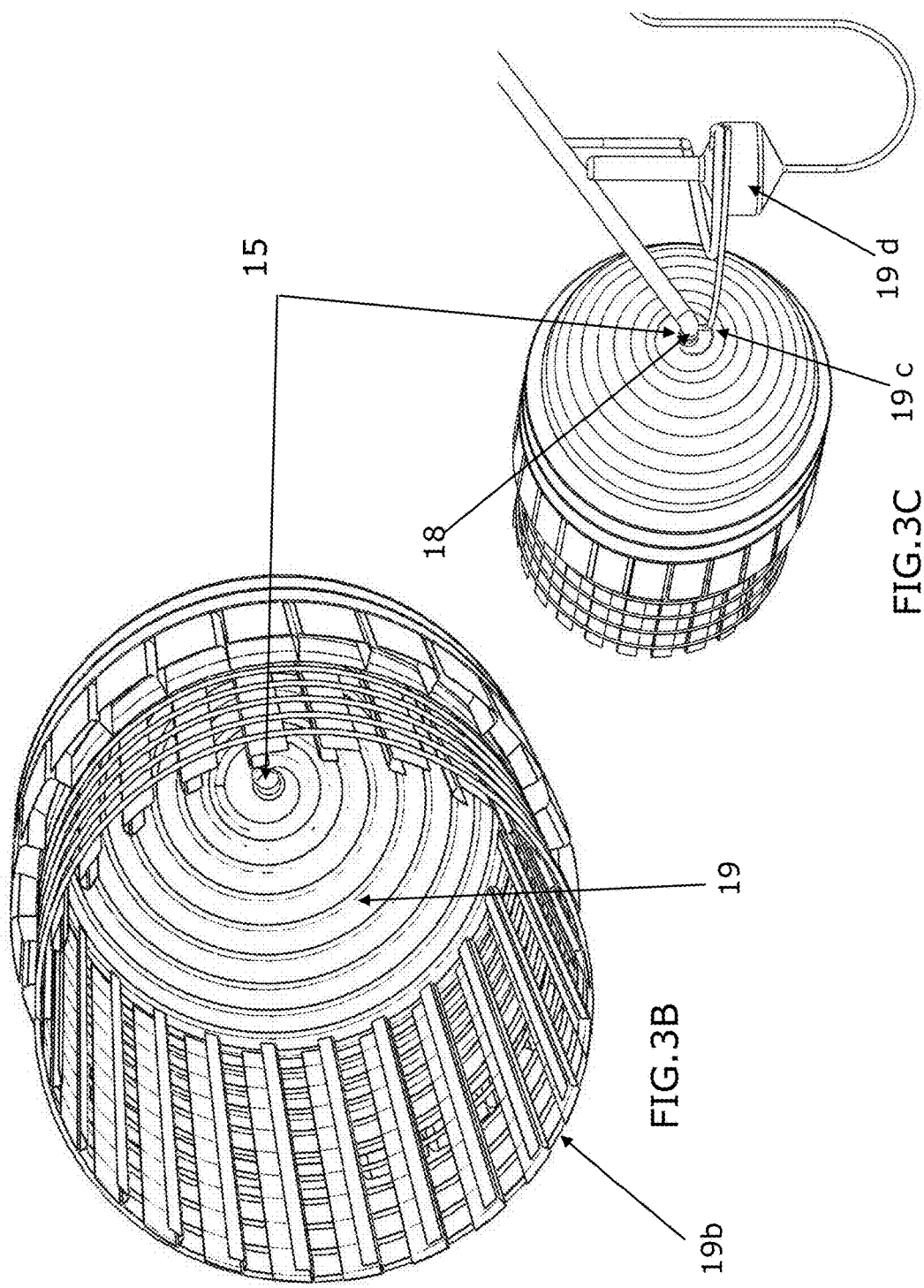

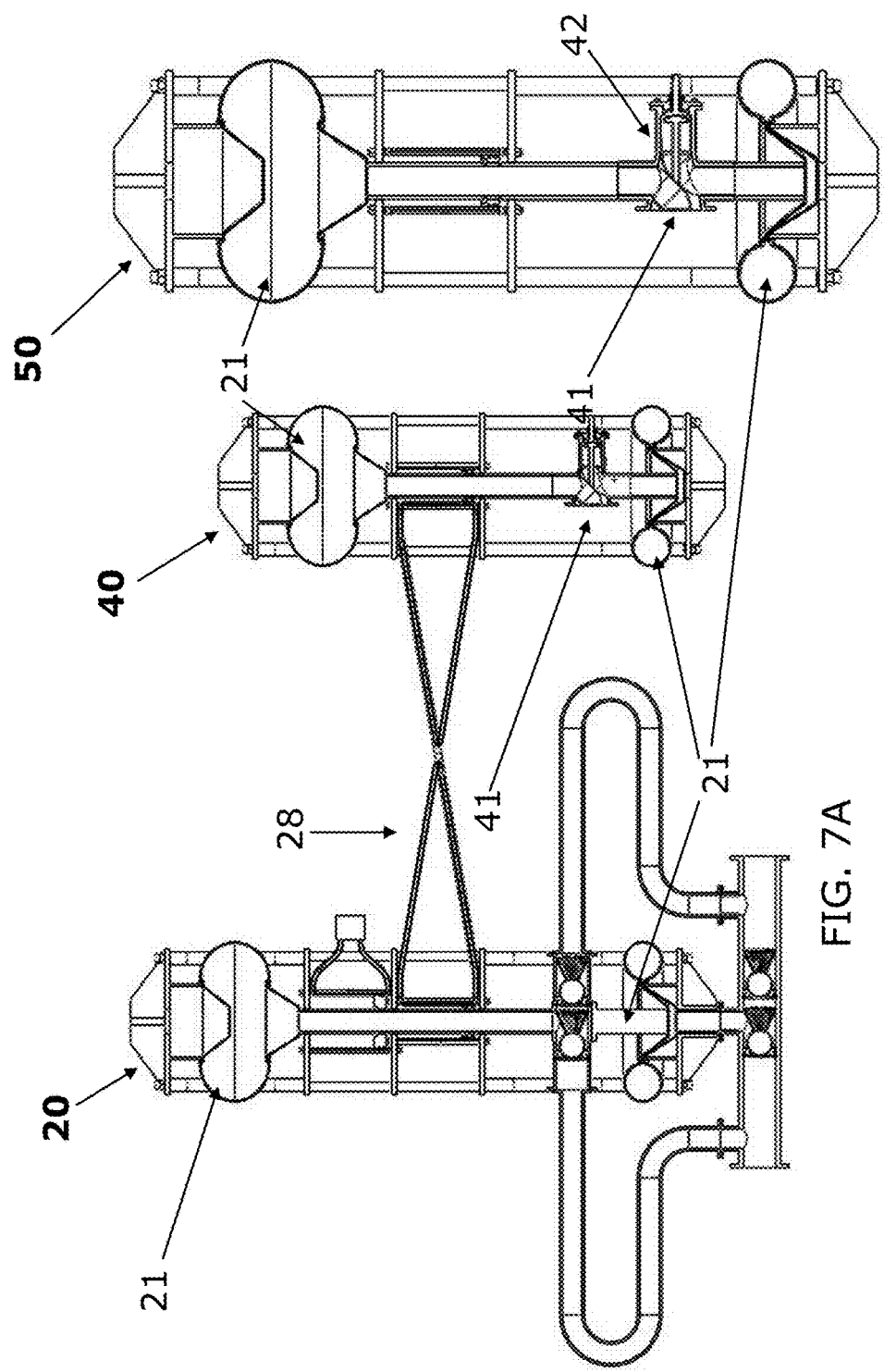

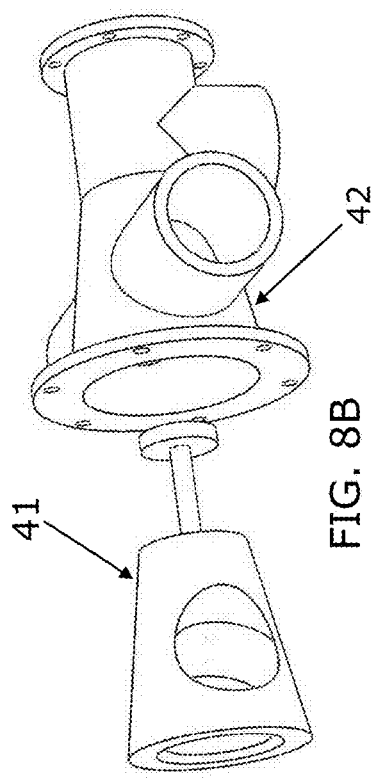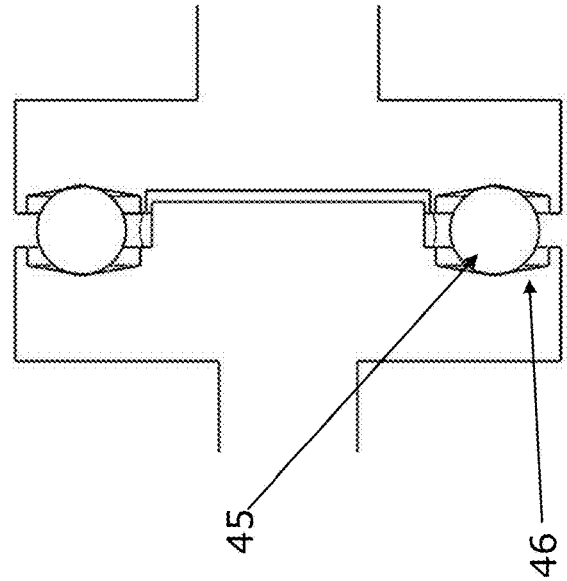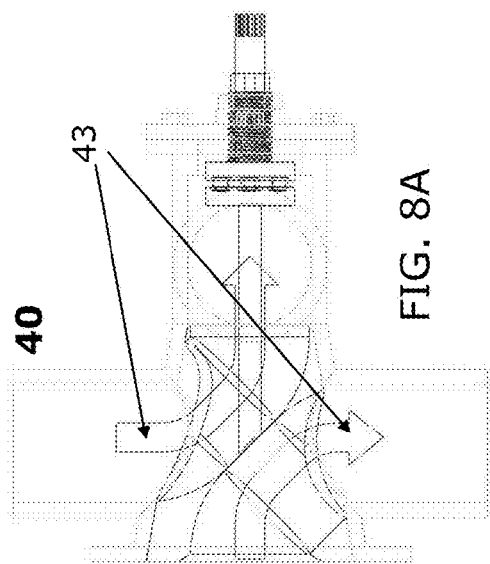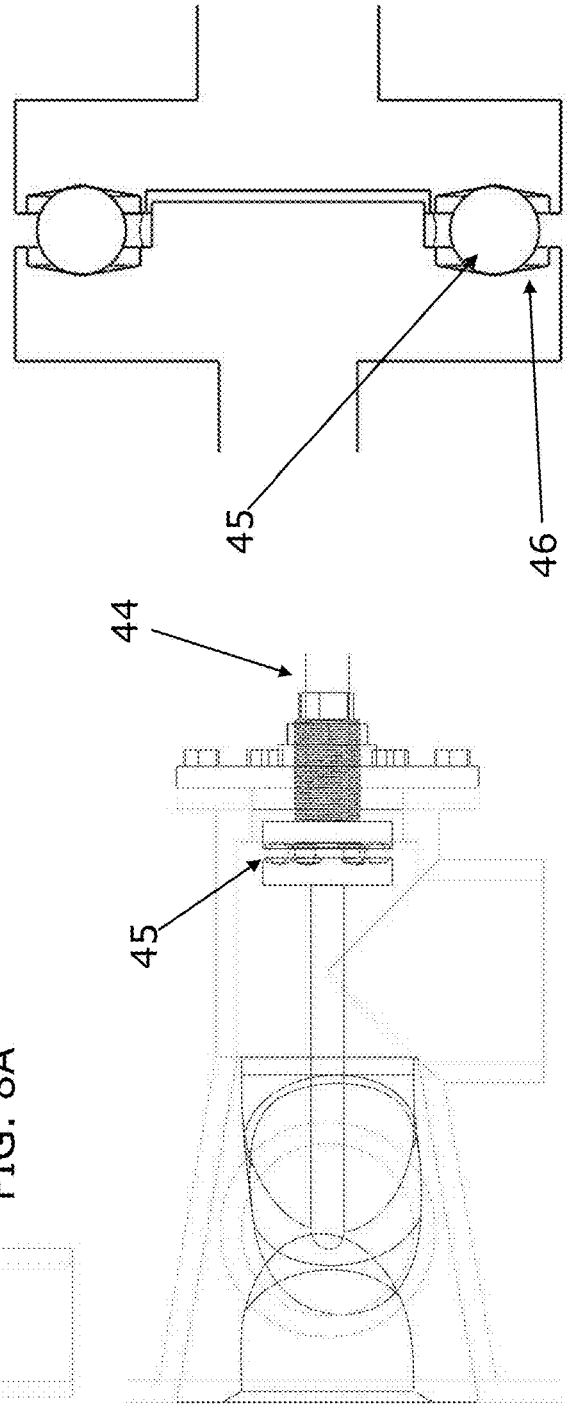
FIG. 8A
FIG. 8B
FIG. 8C
FIG. 8D

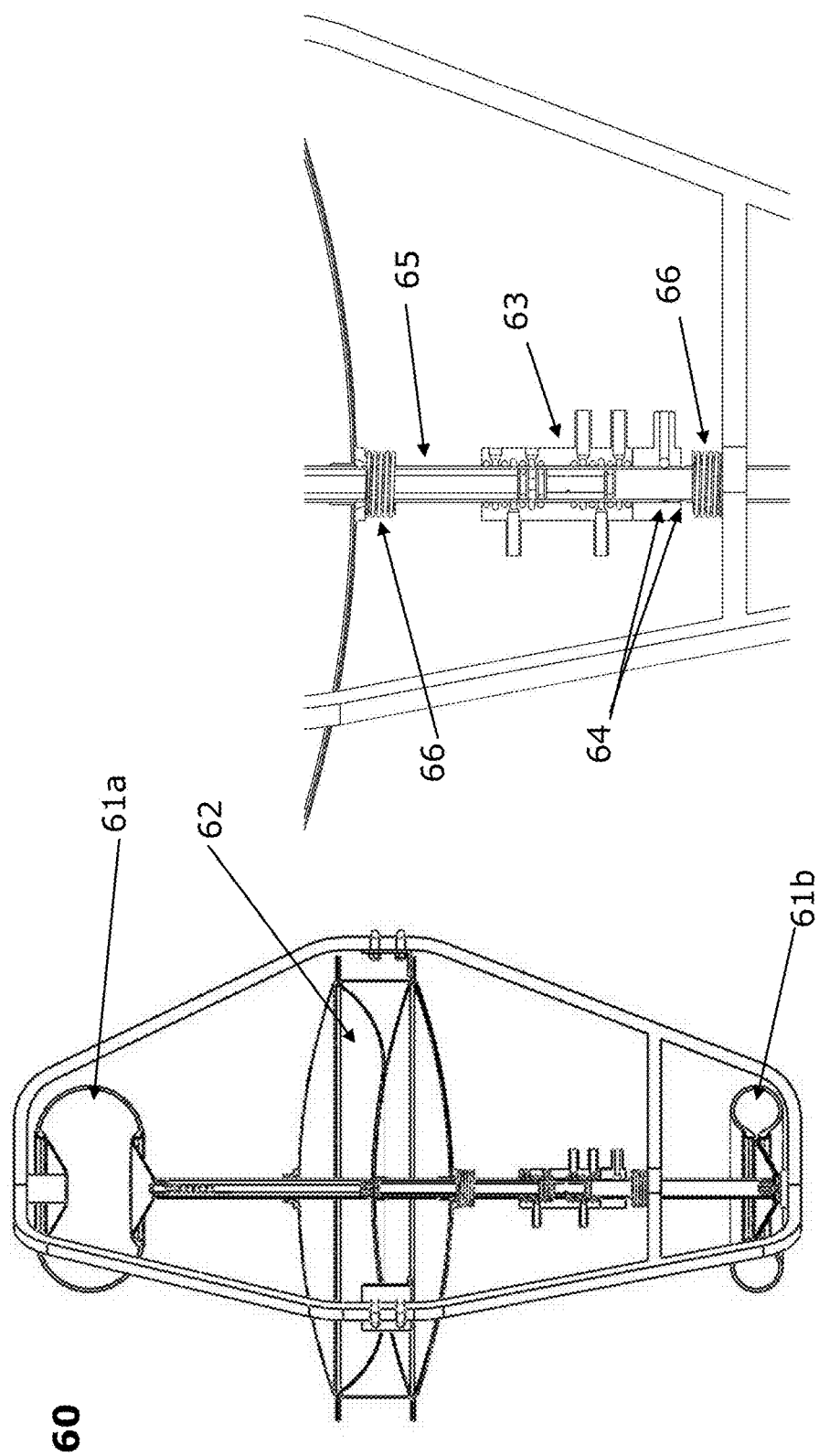

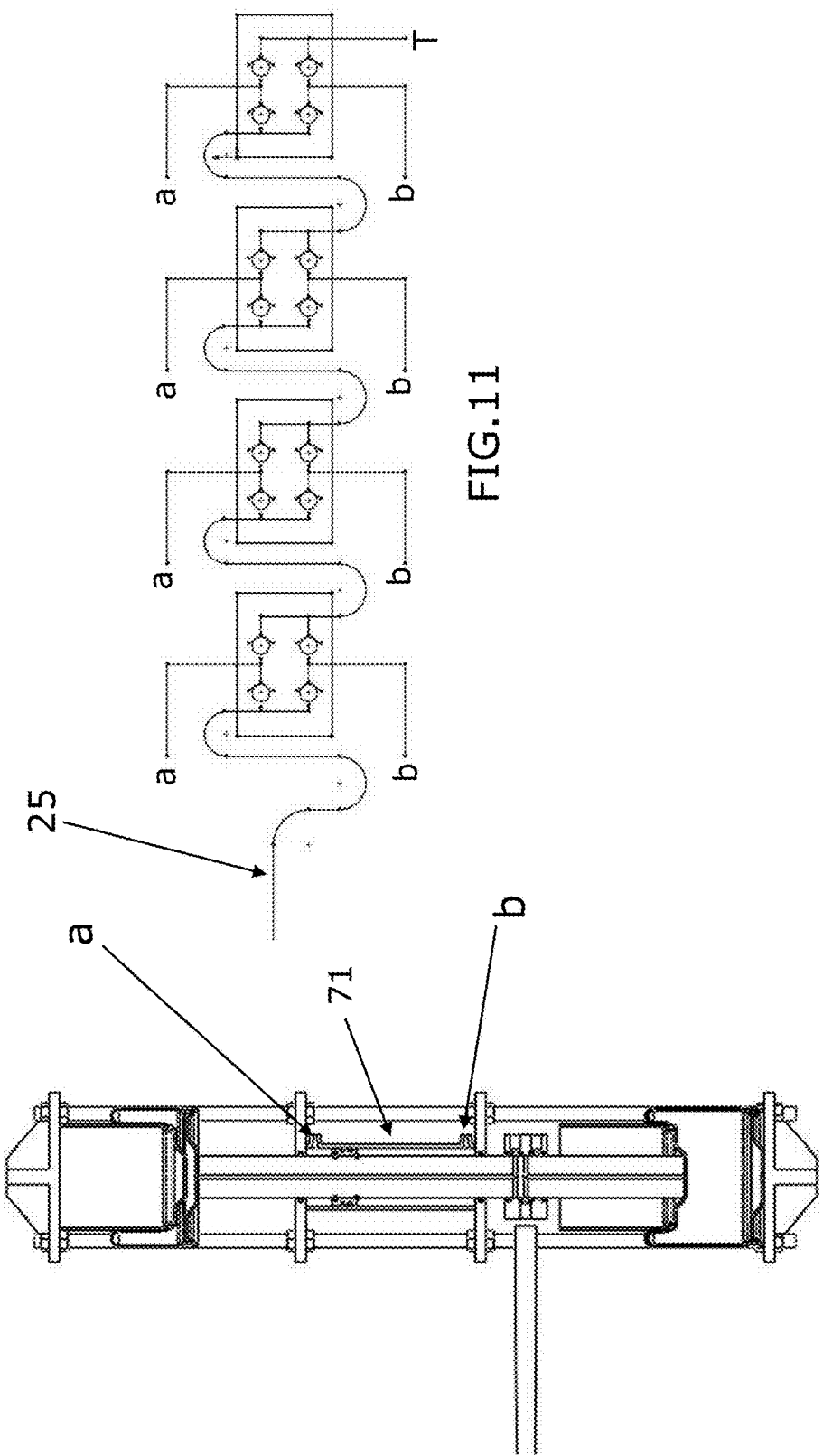

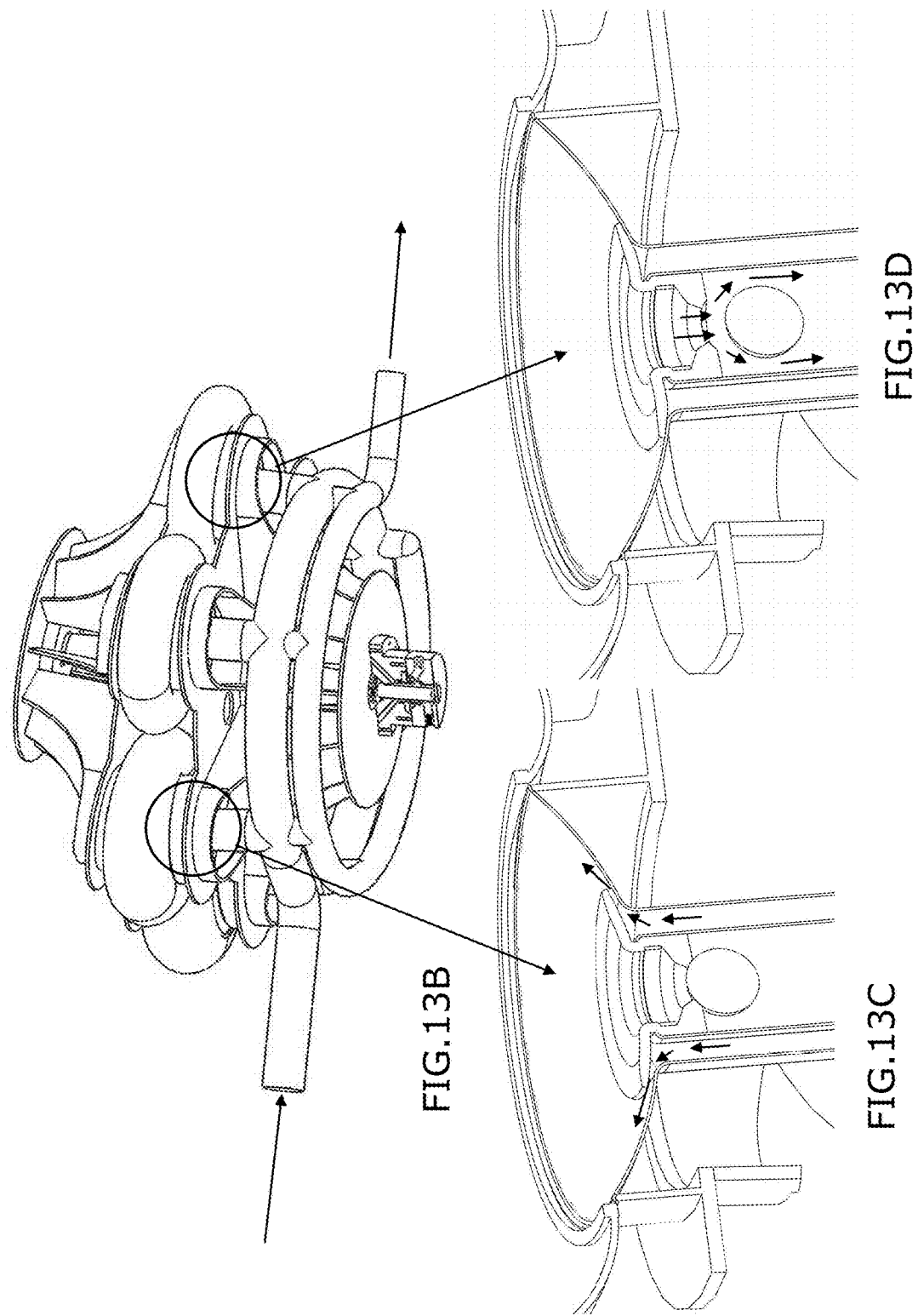

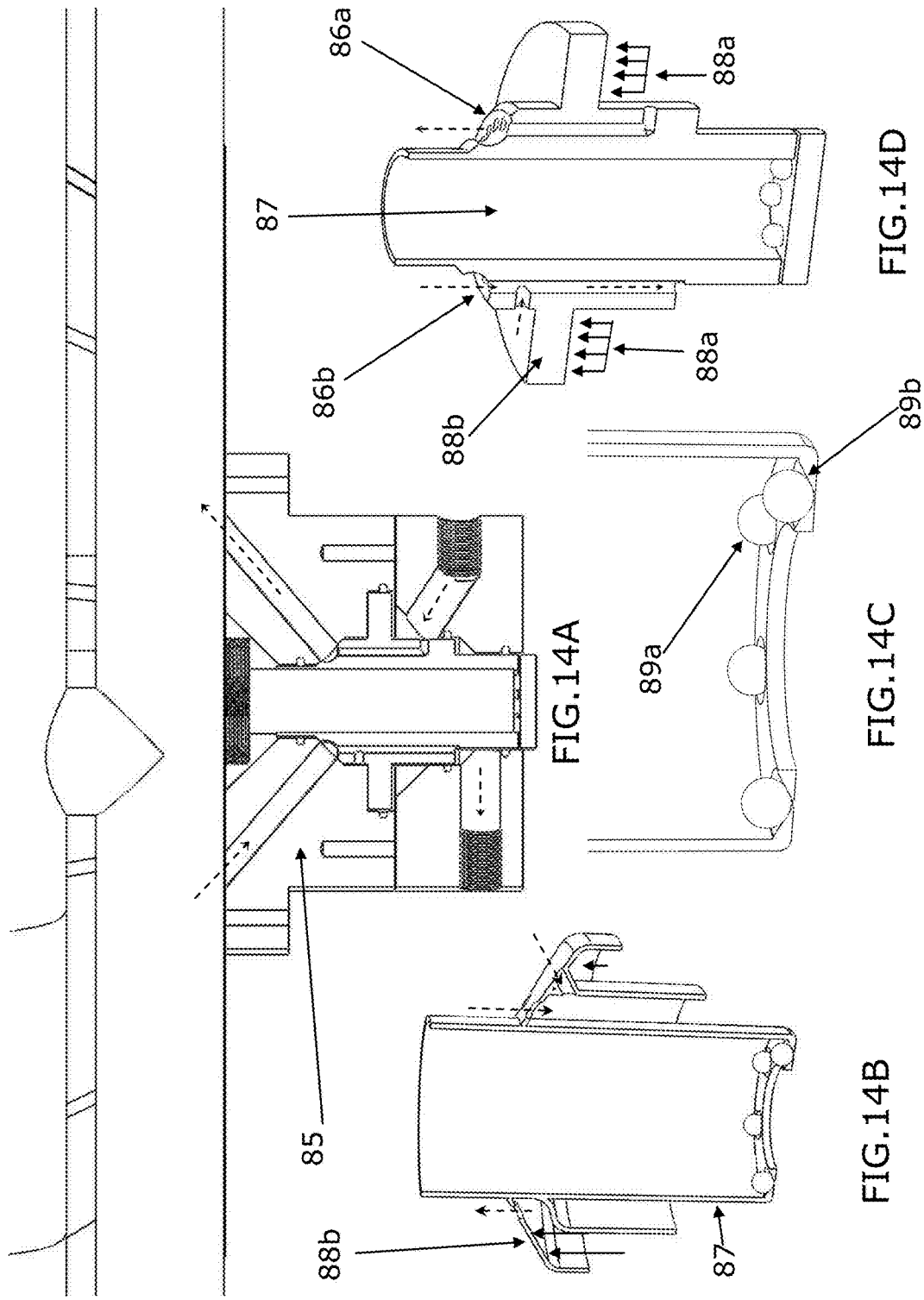

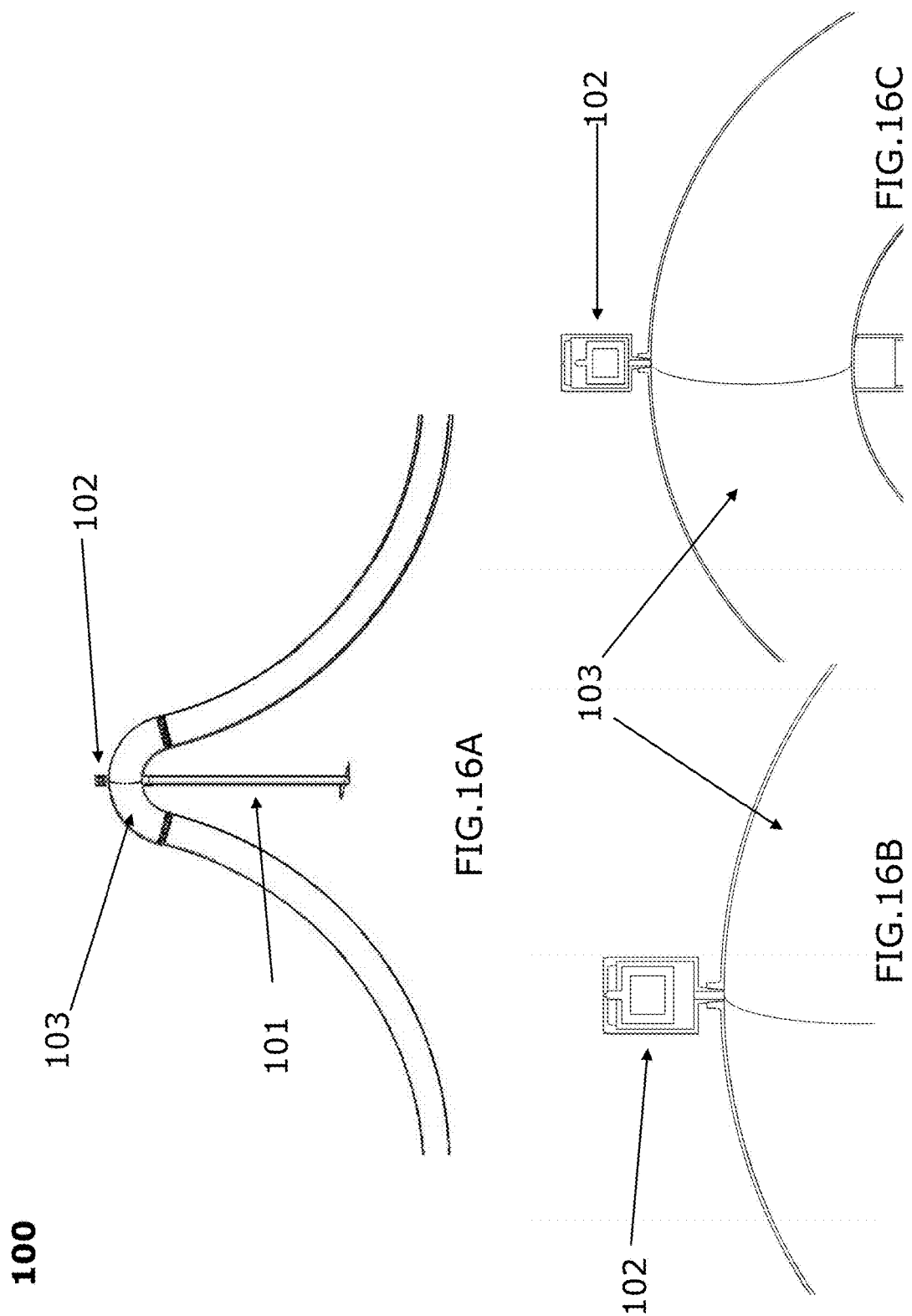

FLOATING METHANATION SYSTEM

CROSS-REFERENCE TO RELATED APPLICATIONS

A petition for the grant of a patent on the same invention was filed with the Canadian Intellectual Property Office and a filing certificate has been issued with the application Ser. No. 2,875,345 and a filing date of Dec. 16, 2014. At the time, the title of the invention was stated as LE PROCEDE DE METHANISATION GILLES NADON. The title will be changed to FLOATING METHANATION SYSTEM (in French SYSTEME DE METHANISATION FLOTTANT). The Canadian Intellectual Property Office has attributed the international classification CO2F 11/04 (2006.01) to the application.

A certified copy of the filing certificate will be forwarded by mail.

The applicant is claiming the benefit of this prior-filed pending application.

BACKGROUND OF THE INVENTION

The invention is in the field of the treatment of wastewater by methanation.

Methanation is a process that transforms putrescible material into a gas by anaerobic digestion. The putrescible material is mixed, in a closed tank, during several weeks. In this milieu, microorganisms are formed that will nourish themselves from the putrescible material. The products of this process are: a biogas that can be refined into methane and a digestate usually dehydrated to be used as a fertilizer.

For centuries, it is known that gas can be produced from sediments. Equatorial developing countries have constructed bioreactors that consist of an airtight dome with tunnels diametrically opposed to create a chamber where bacteria consume excrements and produce the gas used for cooking and lighting.

Countries with a colder climate have taken up the idea to generate electricity, sometimes adding cultivated material to the input, each of them reproducing the airtight chamber as stationary structures above the ground were the mixing and heating elements are accessory. The problems related to such structures concern the costs involved in building and operating them, and the energy needed for mixing and heating the contents.

High costs are also involved when the energy produced has to be used as a force to mix the contents when the conditions that facilitate the movement are absent. When the movement has to be applied to the mixture in a stationary structure, the force never achieves its autonomy of movement because it is too slow. The stagnating elements tend to clog and to annihilate the force.

Considerable energy is also needed to maintain the very precise temperatures essential to create a favorable environment for the microorganisms to transform the material into biogas. The energy has to drive through clogged elements when the construction is fully exposed to a rigorous climate.

Concerning the waste disposer, one of the problems that seem to be related to the current state of technology in this domain is the odor emanating.

A research has been conducted by Eric Fincham & Company. This research has yielded information concerning five existing U.S. patents in related fields of endeavor. These are listed in the attached letter from the agent dated Jul. 28, 2015. None of the existing patents have demonstrated a floating system such as the one that is claimed in this application.

SUMMARY OF THE INVENTION

The technical field to which the invention relates is the treatment of wastewater by methanation.

It is common to build stationary processors where different means are used for mixing and heating.

The new idea is floating vessels revolving on themselves by the action of air being ejected from beneath them. Revolving in water keeps the process in perfect temperature and totally blends all the content, and the invention includes an odorless waste disposer unit.

In the proposed invention, the processors consist of cylindrical vessels floating in water, mixing their content by revolving on themselves by the action of air ejected from underneath that lodges into buckets set as the teeth of a circular saw.

The invention aims to bring solutions to the problems identified in the background section, i.e. structure problems, as well as mixing and heating problems.

The new approach aims to be economical with regards to the structure of the containers simply because they float with their contents, in perfect relaxation, and by adding to the vessel flotation rings that annihilate its own weight.

The invention also aims to perform well with respect to the mixing of the contents or substrate by being more economical pertaining to the energy required. Revolving in water engages all elements in a collective momentum, from a multiplied force, because of the constant free power of each air bubble captured by the exterior buckets and grouped as a lifting force.

As for the heating problems, the fact that the processor is floating in water and bathing under the ground level, it is not exposed to cold. Furthermore, it is possible to easily establish entirely homogeneous and precise temperatures that are needed for the mesophilic and thermophilic processes.

The invention also entraps the gas production in all processors to rise it in pressure and use it as power to several assets and new embodiments expressed as follows:

Pressure in each vessel will be arranged in a decreasing cascade from one to one to push the sludge through all of them.

Gas pressure will activate pumps that will supply the air to revolve the processors.

Gas pressure will also activate hydraulic pumps to add to fluid pressure that will power sludge inlet pumps.

The gas pressure will activate rotary pumps that will carry all the incoming water through some of the process stages, and all the way through a network of hoses through rivers, streams and ditches to bring the matter as fertilizer which most is decontaminated to farmlands and wild land.

Finally, the gas will boil distilled water to run a steam engine that will drive a generator and transfer the heat in the system and purify most of the wastewater.

The putrescible material that is to be treated by the methanation process would preferably come from the sewage systems; therefore, the invention proposes an odorless waste disposer unit. This device addresses the problem of odor emanating from the sink by flooding the chopping chamber with water and using a swivel plug that leaves a gap of fresh water from the last use of the tap.

BRIEF DESCRIPTION OF THE VIEWS OF THE DRAWINGS

FIG. 3B is a sectional perspective view of the inside of the exit end of a processor.

FIG. 3C is a sectional perspective view of the outside of the exit end of a processor, also showing a sinking reservoir that receives heavy material to be discarded.

FIG. 7A shows sectional elevation views of the primary inlet pump, and of the first swiveling valve exhaust pump, also illustrating the hydraulic match in-between these two pumps.

FIG. 7B is a sectional elevation view of the second and last swiveling valve exhaust pump.

FIG. 8A is a cut elevation view of the inside of the swiveling valve, showing the cross-directional tunnels.

FIG. 8B is an exploded diagonal view of the swiveling valve, and its casing.

FIG. 8C is a cut top view of the swiveling valve, showing the command of rotation and the balls transfer connection.

FIG. 8D is an expanded cut view of the balls transfer connection.

FIG. 9A is a sectional elevation view of the air pump.

FIG. 9B is an expanded view of the valve portion of the air pump.

FIG. 10 is a sectional elevation view of the hydraulic pump.

FIG. 11 shows a diagram of the hydraulic addition of each element.

FIG. 13B shows a perspective view of the rotary pump.

FIGS. 13C and 13D show expanded views of the flap water valves in the rotary pump.

FIG. 14A shows a detailed expanded cut view of the rotary valve.

FIGS. 14B, 14C, and 14D show detailed expanded sectional views of the inside of the rotary valve.

FIG. 16A shows a detailed perspective elevation view of the ascending slopes of the hoses in the network of hoses.

FIGS. 16B and 16C show detailed expanded views of the floating valve on top of the elbow and Y connections in the hoses.

DESCRIPTION OF THE INVENTION

Figure 1:
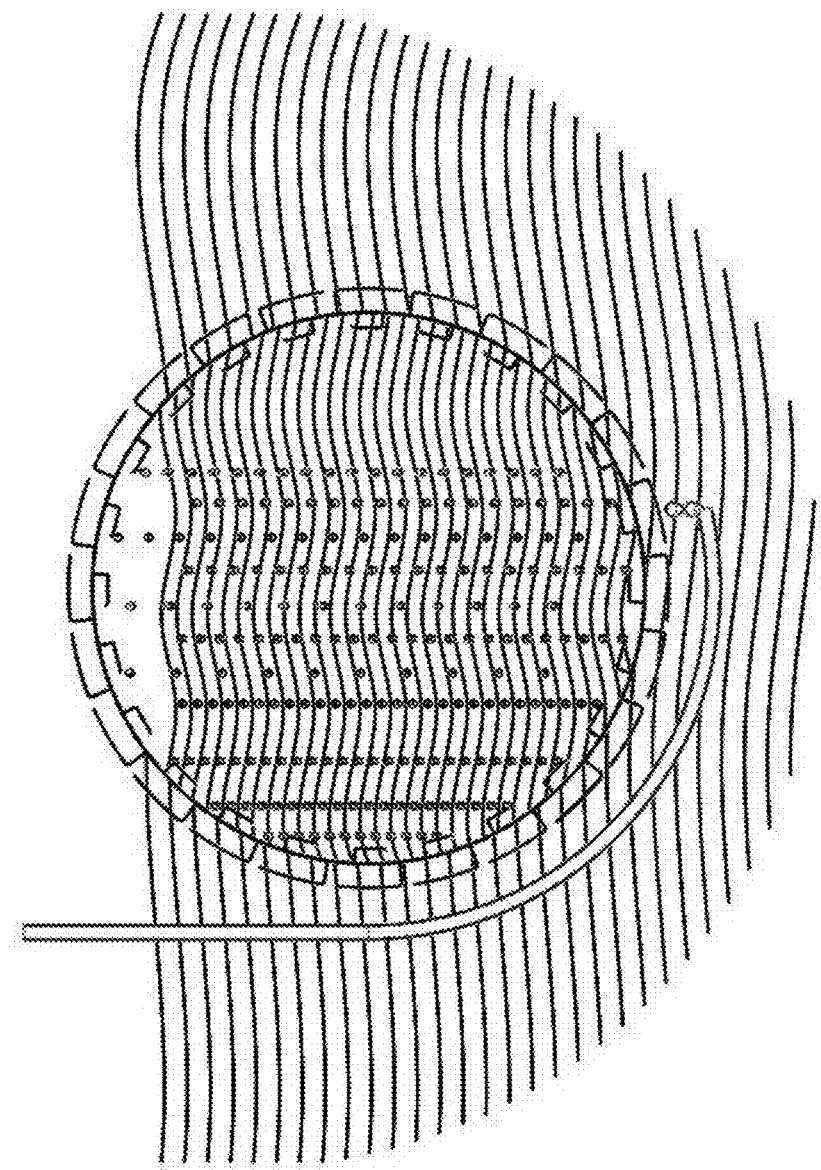
FIG. 1 illustrates a sectional side elevation view of an immersed processor where the exterior air conduit would make it revolve, and consequently inside gas bubbles would go up while the heavy material would go down. This figure could be used as the front page illustration.

Referring to the drawings in greater detail and by reference characters thereto, there is illustrated an anareobic methanation system that works by means of multiple cylindrical vessels (bioreactors or processors) almost totally immersed in water. A sectional side view of one of these bioreactors is shown in FIG. 1.

Figure 2:
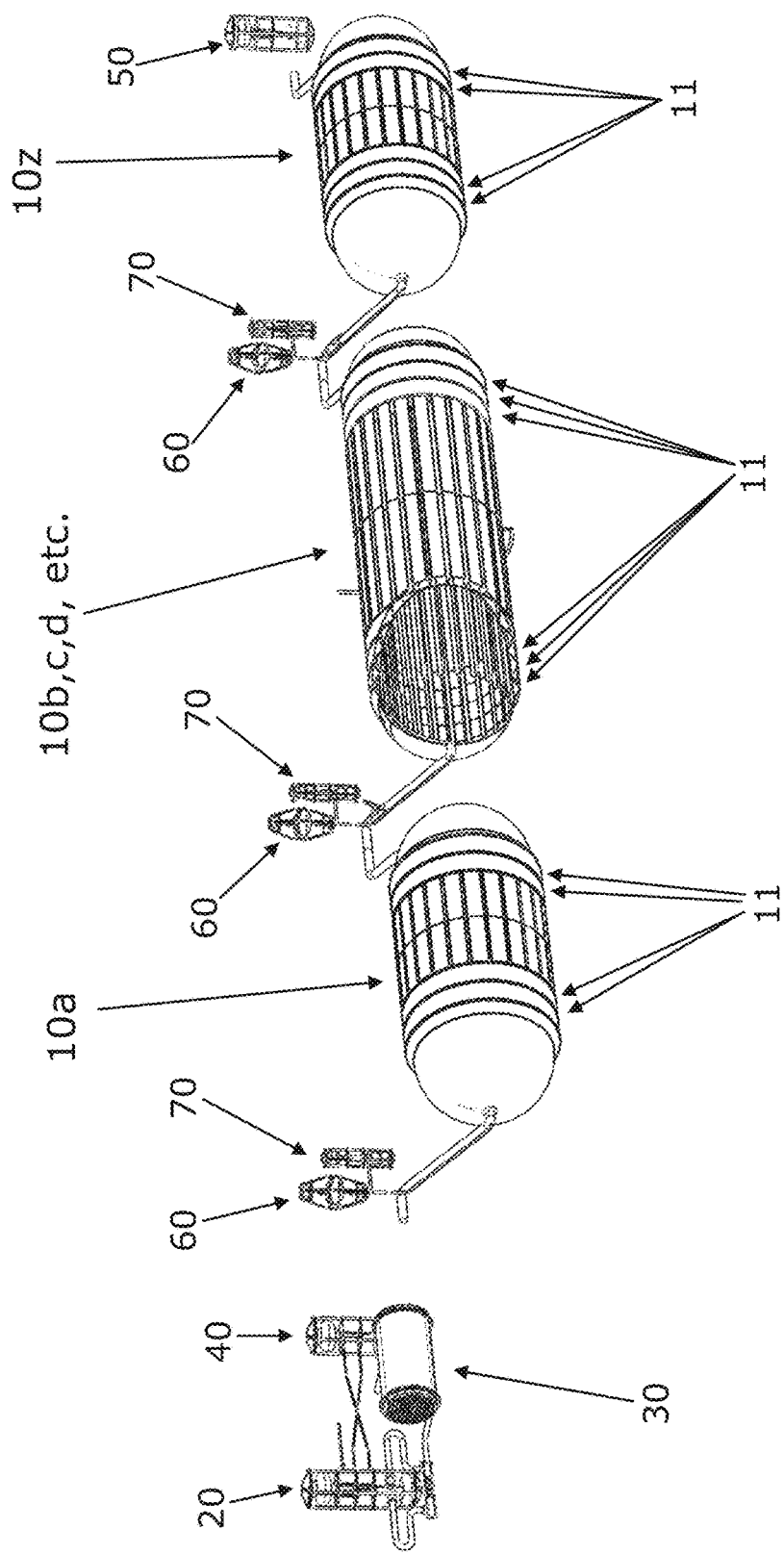
FIG. 2 represents a general view of the spirit of the system.

Each immersed vessel is a pressurized cylindrical bioreactor 10, comprising flotation rings 11 positioned at each end to stabilize its horizontal level. Air buckets 12 are positioned along the longitudinal middle shell to trap air ejected through a conduit 13 beneath the vessel 10, and to use this air as a force to revolve the vessel 10, and mix its content. These can be viewed in FIG. 2 and FIG. 3A. Since there are several processors, the first one of a series is designated as processor 10a, the middle ones that can be more or less numerous are designated as 10b, 10c, 10d, etc., and the last processor is designated as processor 10z.

Other buckets 14 (see FIG. 3A) are positioned inside the revolving vessels 10 facing in the opposite direction from the outside ones 12 to grab and mix the contents by sinking the gas, and floating elements while raising the heavy matter from the bottom to let it sink back, crossing the climbing gas bubbles.

Each vessel has an inlet and outlet spout 15 in the middle point of its longitudinal ends. The spouts 15 leave the bioreactors free to swivel into inlet and outlet conduits 16 that drive and exhaust the substance from vessel to vessel. The conduits 16, drawing from a surface point, could be used to maintain the position of the processors 10. The spouts 15, and the conduits 16 are best seen in FIG. 3A.

Because the purpose of the invention is to divert all of the wastewater, and particularly to prevent the pathogenic elements from flowing back to the rivers or waterways, the gas created from the solid and putrescible matter is trapped in each processor to rise in pressure and activate a chain of mechanical motions. These will be explained in more detail later.

Figure 3A:
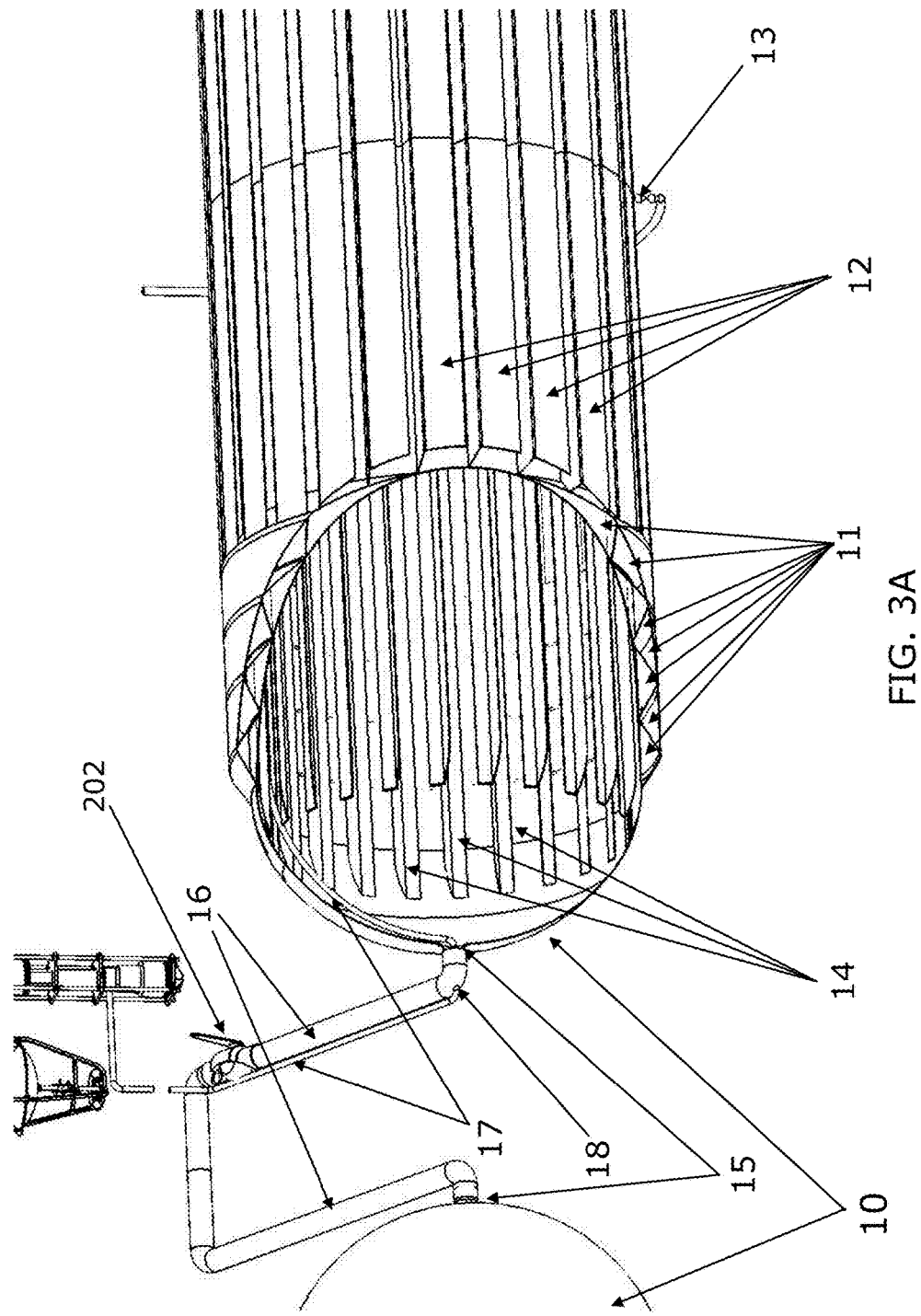
FIG. 3A is a perspective view of a processor with a cut showing the inside.

In FIG. 3A, it can be seen that the inlet conduit 16 carries a pipe 17 releasing the gas captured inside the top portion of the vessels 10. This pipe 17, coming from the top space inside the vessel 10 where the gas accumulates, could cross the inlet conduit 16 at the elbow 18, follow this conduit 16 to the outside surface of the basin where the gas could be held by a pressure relief valve, and directed to all the apparatuses for the functioning of the system.

As can be seen in FIG. 3B, inside the exit end of each vessel, there is a spiral channel 19 used to screw the heavy stuff from the bottom through the outlet spout 15. The first vessel 10a, used to decant the unwanted matter such as sand and gravel, has helical flatbars 19b along its inside shell to plow it quickly. The exhaust plumbing elbow 18, could carry a lower extra port 19c to let the heavy stuff fill a sinking reservoir 19d that a valve will empty from the pressure of the vessel when the said reservoir 19d has sunk to a certain level.

In addition to the floating and rotating processors, several types of pumps and other apparatuses are part of the invention for the functioning of the whole system.

Figure 4:
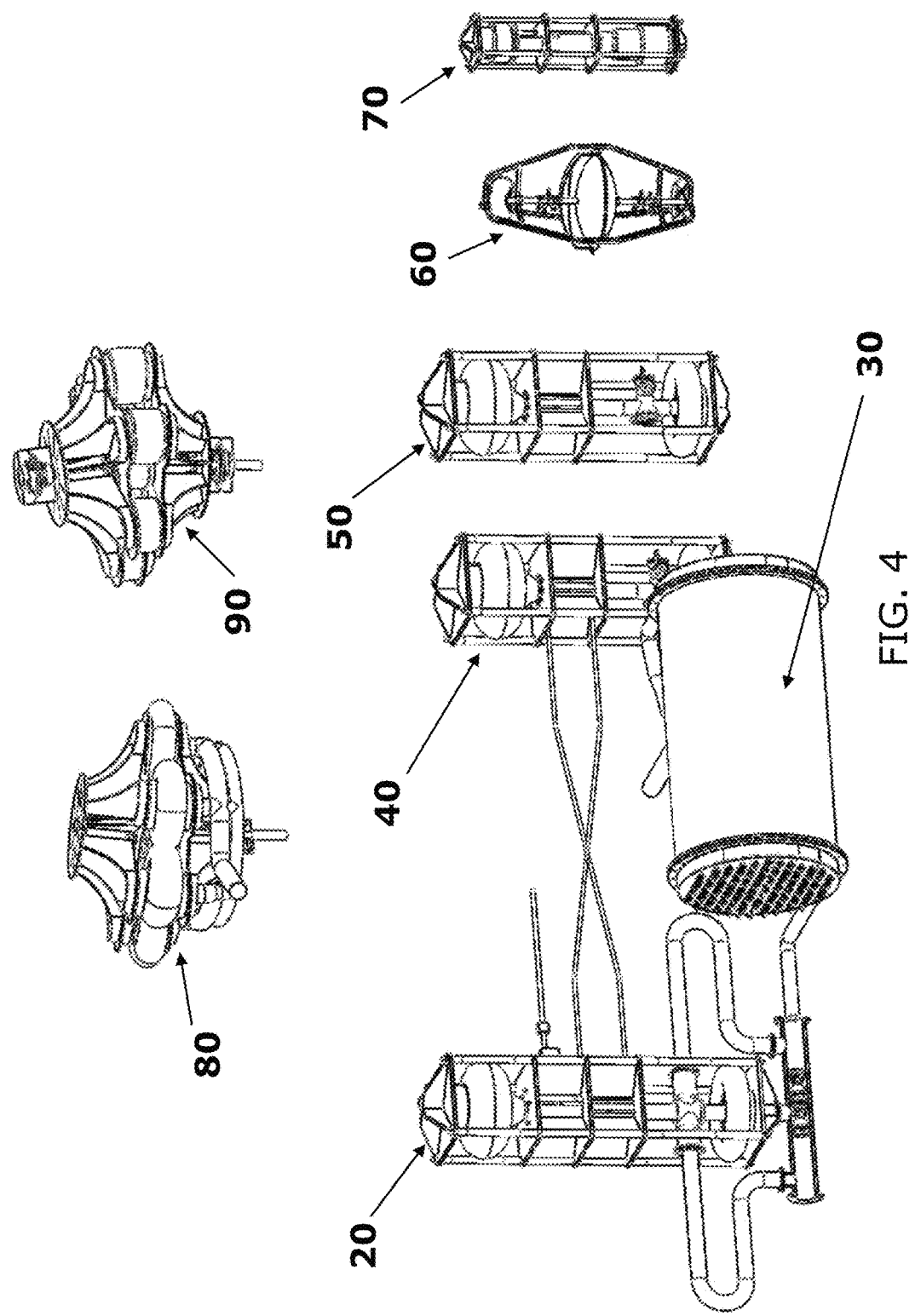
FIG. 4 shows the different pumps and other apparatuses for the functioning of the system.

There is a primary inlet pump 20, heat exchangers 30, a first swiveling valve exhaust pump 40, a second and last swiveling valve exhaust pump 50, air pumps 60, hydraulic pumps 70, rotary pumps 80, and rotary steam engines 90. For illustration purposes, these have all been grouped together in FIG. 4.

Figure 5:
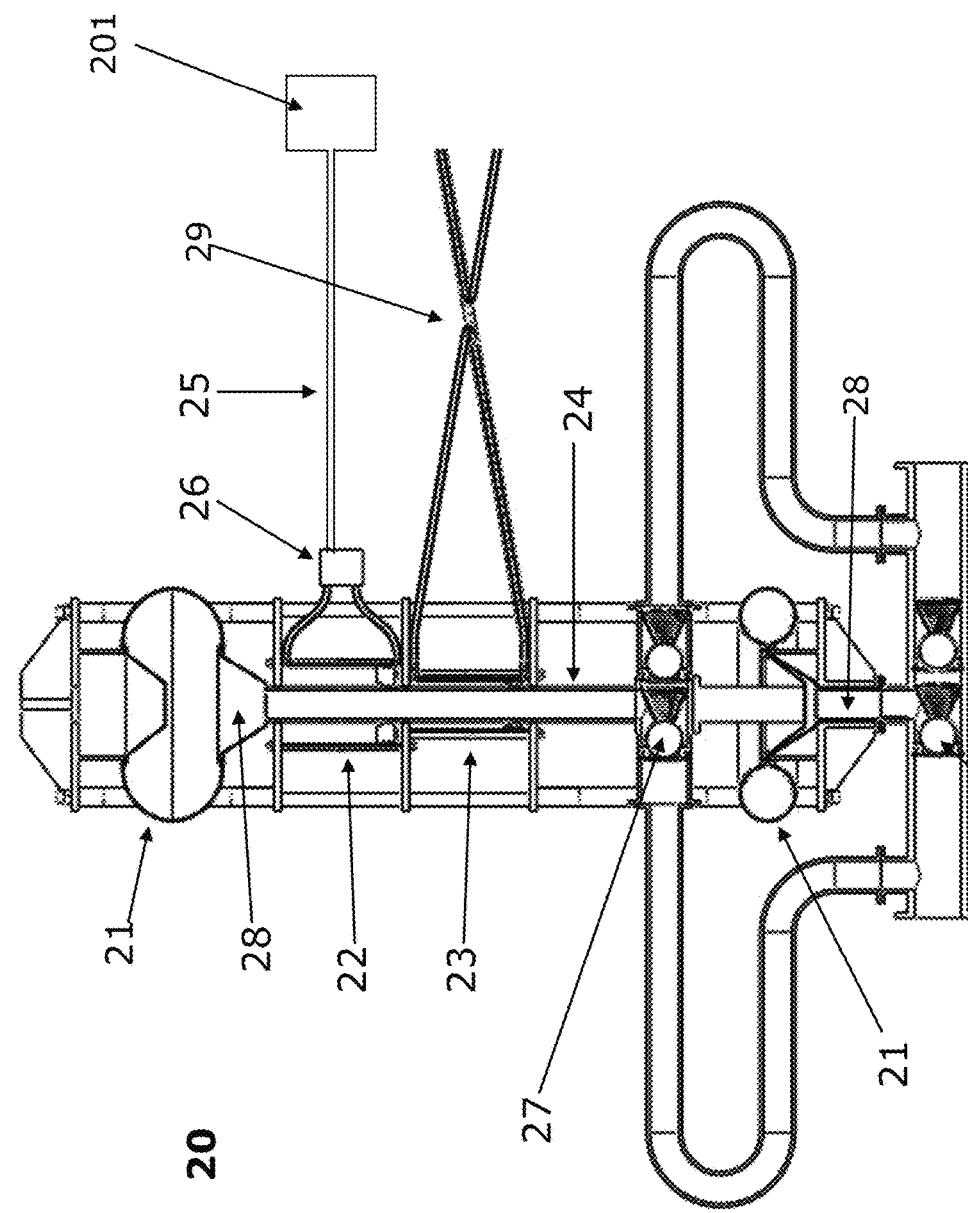
FIG. 5 is a sectional elevation view of the primary inlet pump.
Figure 12:
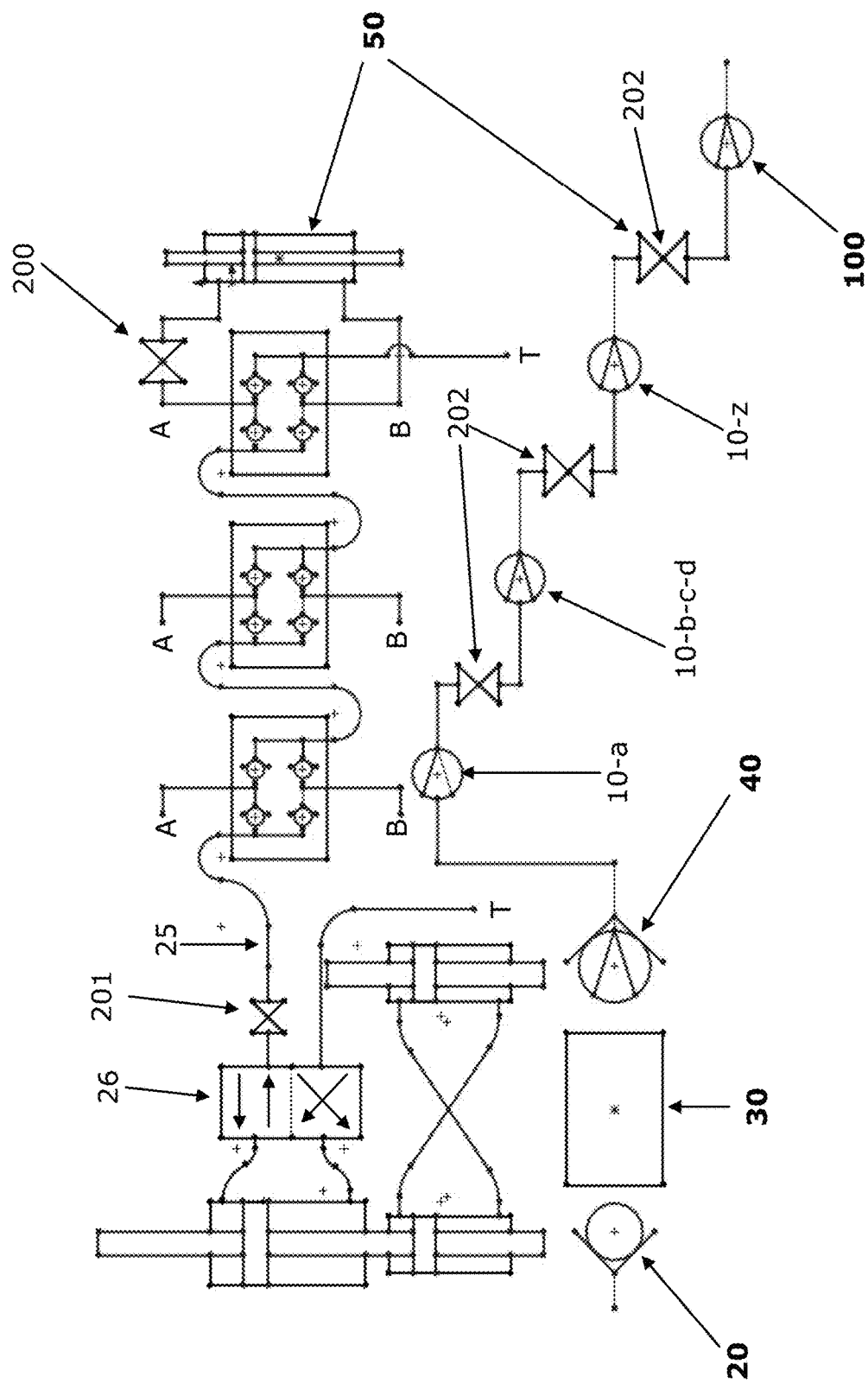
FIG. 12 shows a diagram of the ideal display of all components of the system, including the hydraulic power line.

Inlet of substance to the first processor is supplied by the primary inlet pump 20 controlled from a shut-off valve 201 that opens or closes the hydraulic line 25 (see FIG. 5) depending on the level of immersion of the processor. Flow from vessel to vessel goes through a shut-off valve 202 (shown in FIG. 3A) on the inlet conduit 16 of all the processors following a cascade of decreasing pressure from one to the other. A diagram showing the ideal display of all components of the system including the hydraulic power line 25 is shown in FIG. 12.

The primary inlet pump 20 (best viewed in FIG. 5) would preferably be positioned at the sludge level, so as not to require any suction force. It is made of diaphragms 21, shaped as typical vehicle tires except the reinforcement display and the elastomer component. It is acting from two hydraulic cylinders 22 and 23, attached to a middle hollow shaft 24. One cylinder 23 is following the hydraulic action of its parallel first swiveling valve exhaust pump 40, and the main cylinder 22 is driven by the hydraulic power line 25, ideally through a mechanical pilot valve 26.

The sludge flows through check valves 27, penetrates, and escapes the pump diaphragms from a bottom path 28 relative to each diaphragm so that no low cavity spots will be left to retain heavy substance.

The crossed hydraulic connection 29, in-between the primary inlet pump 20 and the first swiveling valve exhaust pump 40 (best seen in FIG. 7A) serves to squeeze the pressure force created by the heat exchanger 30 as a vise action.

Figure 6A:
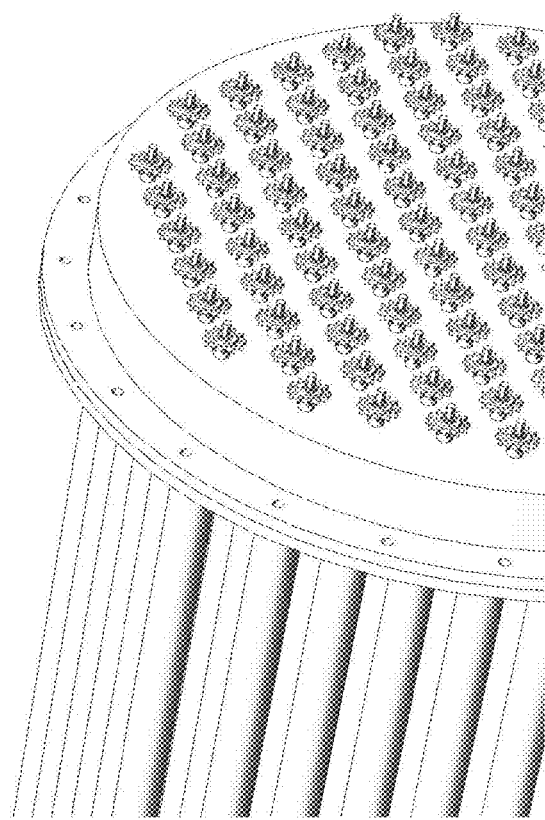
FIG. 6A shows a partial perspective view of the heat exchanger.
Figure 6B:
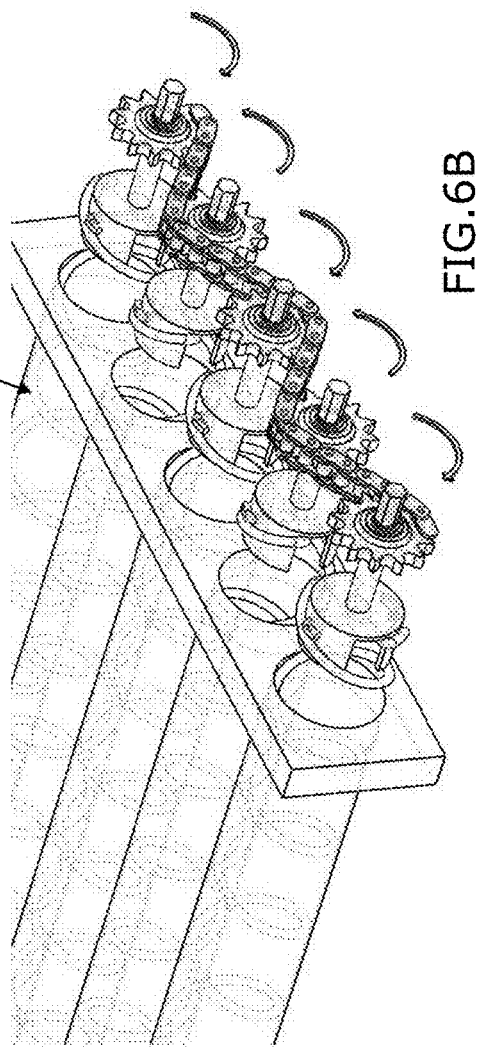
FIG. 6B shows a close-up partial view of the coil scrapers inside the heat exchanger tubes.

The heat exchangers 30 (seen in FIGS. 6A and 6B) are standard equipment, but these hold coil scrapers 31 inside their tubes. These scrapers 31 (seen in FIG. 6B) will turn occasionally to remove any sticking matter from the inside walls of the tubes. The scrapers 31 could turn by a hydraulic motor driven by the hydraulic power line. Each of them could be activated independently by dog shifters, engaging in sprockets.

The first swiveling valve exhaust pump 40 (see FIG. 7A) is a diaphragm pump identical to the primary inlet pump 20 except that it acts from a swiveling valve 41 (seen in FIGS. 7A and 7B, and in more detail in FIG. 8A to 8D) that shifts the sludge direction from one diaphragm 21 to the other to retain the pressure until the stroke lets it free.

As best seen in FIG. 8B, the form of the swiveling valve 41, sitting in its casing 42, is conic to use the perfect fit as a sealing force to retain the entering pressure, and seal in-between the pieces. The swiveling valve 41 has two cross-directional tunnels 43, reaching each diaphragm 21, when it turns from side to side.

The swiveling valve 41 is driven to reverse its alignment at the end of each stroke of the pump action. To break the taper squeezing force of the swiveling valve 41 in its casing 42 while turning, the device of rotation 44 transfers its motion to balls 45, lugged in-between conic holes 46 of which the facing angle is perpendicular to the swiveling valve 41 taper edge. Activating the shifting motion pushes back the conic swiveling valve 41, so that the pressure keeps the gap closed while turning with no friction. The swiveling valve 41 makes a back and forth half-rotation to prevent the winding of unwanted material. During the turning movement, the cross-directional tunnels 43 start from their full openings to a diaphragm 21, go through a surface of total obstruction to arrive finally to the other full openings to a second diaphragm 21, giving access to the reverse direction without losing anything.

The second and last swiveling valve exhaust pump 50 (shown in FIG. 7B) is identical to the first swiveling valve exhaust pump 40 except that the fluid produced from its cylinder strokes transfers indirectly to the mechanical pilot valve 26 of the primary inlet pump 20 by increasing its pressure by several hydraulic pumps 70 along the hydraulic power line 25 by check valve systems (see FIG. 11 and FIG. 12).

The swiveling valve 41 of the said second and last swiveling valve exhaust pump 50 will shift mechanically from the end of each stroke but the stroke action will be controlled according to the end of gas production from a shut-off valve 200 on its hydraulic power line connection 25. This can be viewed in FIG. 12.

A flow meter is adjusted to let a measured quantity of gas escape the last processor. When the gas pressure reduces under a rated range, the last swiveling valve exhaust pump 50 will be free to operate under the processing pressure, consequently letting the last processor 10z receive new material.

Air pumps 60, illustrated in FIGS. 9A and 9B, supply the air to revolve the processors. They work off the pressurized gas through proportional diaphragm sizes 61a and 61b to transfer high pumping volume into big diaphragms 62, increasing the volume of air, and reducing the pressure to a level sufficient to plunge as deep as underneath the processors 10. A way of acting a pump is expressed in a drawing (FIG. 9B) illustrating a sliding valve 63, retained momentarily in one of two groove positions 64 on the main hollow shaft 65 of the air pump. Valve 63 directs the gas to inflate a first diaphragm 61a whose action will activate a middle wider air diaphragm 62, and collapse the opposite gas diaphragm 61b, then releasing its gas content.

At the end of the stroke, the running course will have compressed a bumper spring 66 before breaking the stubbing position, and shift the valve back to the next groove 64 that reverses the direction.

Hydraulic pumps 70 (see FIG. 10) would run typically as the air pumps except the pumping force of the cylinder 71 is a stage action adding to the arriving force from the hydraulic power line 25 from check valves. In the invention, all hydraulic actions could be stages adding to each other. Alternatively, one single proportional pump could be used for the same purpose.

Another way of driving the air and hydraulic pumps could be by accessory valves available on the market.

The product of the whole process will be fertilizing matter and purified water destined to be brought to the farmlands and forests through networks of hoses that will be described later.

For the purpose of creating a steady ram to push the fertilizing substance through the long hoses course (kilometer wise) in the rivers, streams, ditches, and underground conduits, rotary pumps 80 have been imagined.

Figure 13A:
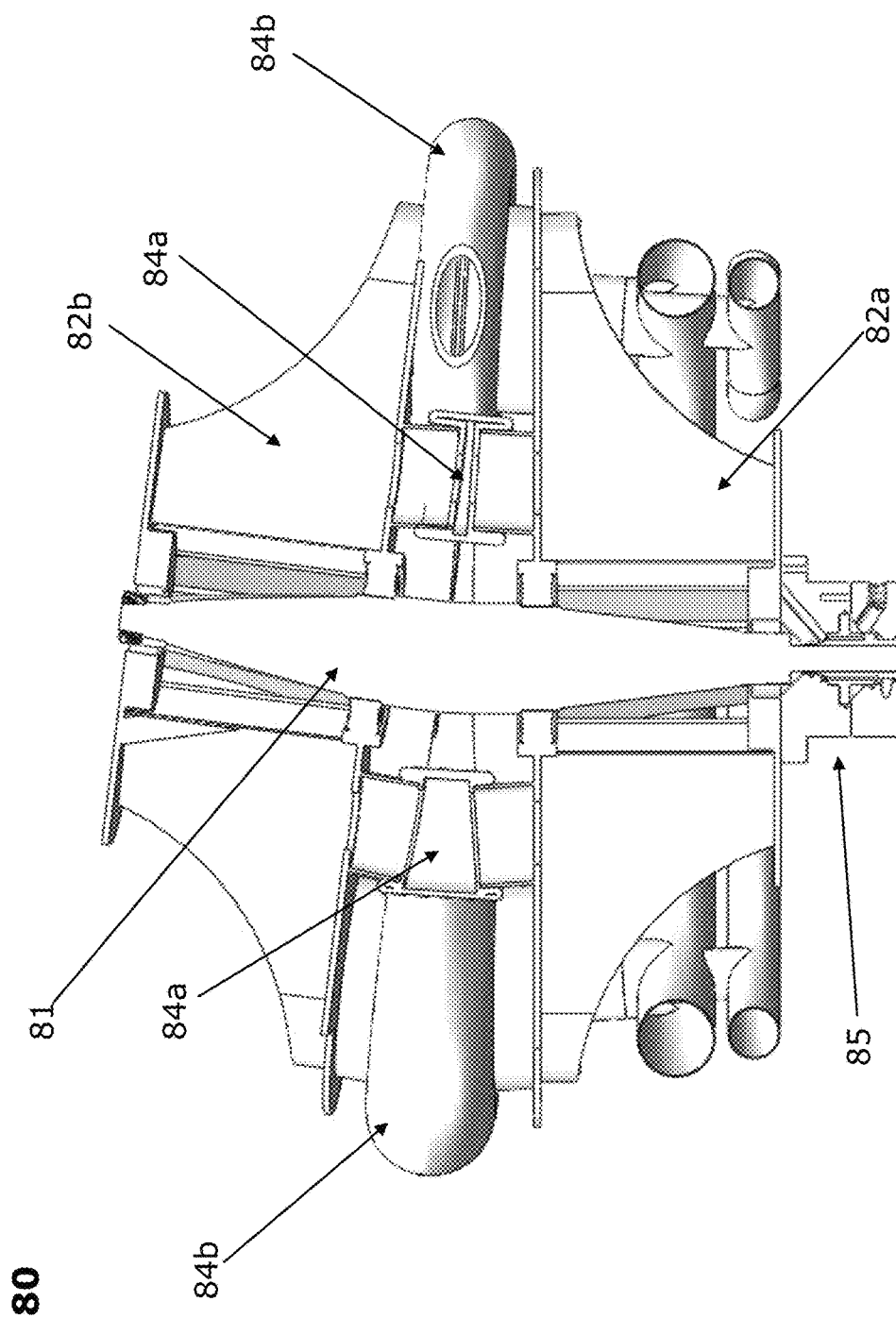
FIG. 13A shows an elevation cut view of the rotary pump.

These rotary pumps 80 (best seen in FIG. 13A to 13D) have a bent shaft 81 turning in the middle of a steady bottom diaphragm spider 82a, rocking an identical top diaphragm spider 82b, making each diaphragm 84a and 84b pump consecutively. Inlet and outlet of water could be controlled by flap water valves shown in FIGS. 13C and 13D.

The motion power of the rotary pump comes from the pressurized gas driving through ports 86*a* on one side of the rotary valve body 87 (shown in FIGS. 14B, and 14D) that follows the rotation of the bent shaft 81, and blows inner and smaller diaphragms 84*a* that force the bent shaft to turn. Ports 86*b* on the other side of the rotary valve body 87 are for releasing the pressure. Broken arrows in FIGS. 14B and 14D show the flow direction of the gas, water or steam.

In the same spirit as the swiveling valve 41, where a taper contact face ensures the perfect sealing, its contact load comes from the gas pressure 88*a* against a flange 88*b* surrounding its body 87.

Like for the swiveling valve 41, balls 89*a*, lodged in taper holes 89*b*, apply a pulling force, acting against the friction of the taper contact.

Figure 15:
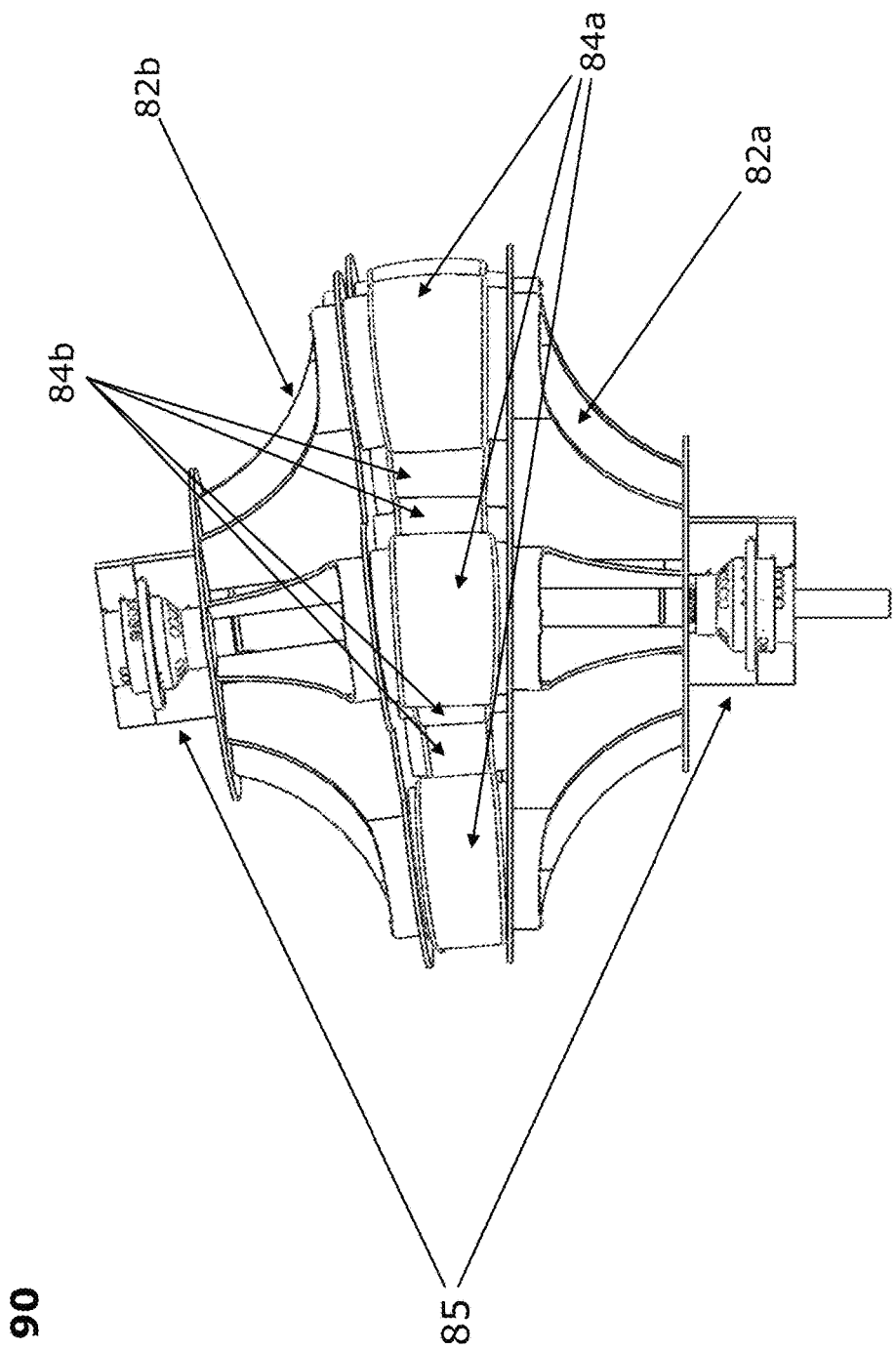
FIG. 15 shows a perspective elevation view of the steam engine.

Steam engines 90 could function on the same principle as the rotary pumps 80. They can run only by using two rotary valves 85 connected one on each diaphragm spider 82*a* and 82*b* as illustrated in FIG. 15. One will drive water to be pumped from the middle and smaller diaphragms 84*b*, and that water running out steadily with pressure will be boiled, and the steam will be directed from the other rotary valve to activate the outer and bigger diaphragms 84*a*. The rotating energy can be used to power generators that produce electricity.

Describing the whole process:

The sludge is pumped into a heat exchanger 30, from a primary inlet pump 20. This sludge is heated and its pressure is trapped in-between a primary inlet pump 20, and a swiveling valve 41 acting into a first swiveling valve exhaust pump 40 for the purpose of killing all the germs and exploding the particles when releasing the pressure. A ratio in-between the size of diaphragms 21 of the two pumps allows the pressure to create a self-motion.

The sludge is then released at a lower pressure into the first processor 10*a* to flow from one processor to the other, as many as needed until a second and last swiveling valve exhaust pump 50 releases it from the last processor 10*z* because the production of gas is over.

The transfer to the first processor 10*a*, used for the decantation of sand, gravel, and unwanted particles is regulated by a shut-off valve 201, mounted on the hydraulic circuit 25 of the dual pumps. This shut-off valve controls the sludge entering according to the flotation level of the processor 10*a*. And so on and so forth in-between all subsequent processors 10*b*, 10*c*, 10*d*, etc. until the last processor 10*z*. Shut-off valves 202 (seen in FIG. 3A), proportional and attached to the sludge inlet conduits 16 of all the processors 10 except the first one 10*a*, operate according to the flotation level of each processor.

The total gas produced is proportional in volume to all the wastewater to be processed. This pressurized gas is used for four purposes.

First, it will activate air pumps 60, ideally from the production of gas of each processor to furnish the air for rotation. Secondly, it will activate hydraulic pumps 70, adding to the hydraulic power line 25 subsequent fluid pressure from one to one. Thirdly, it will push the sludge from processor to processor in a cascade of decreasing inside pressure from one to the other. Fourthly, it will drive rotary pumps 80 that will push all the water through the system and the hose network 100. This network will be described later.

Since that gas is still all available, it will be used to produce heat in a gas burner to boil distilled water to drive new steam engines 90 that power generators. Then, that steam will cool down in heat exchangers 30 that act as the process heat supply.

Because there is an abundance of gas, the heat exchangers 30 will also boil as much of the wastewater as possible and mix it with the purified sludge being released from the processors.

This highly fertilizing purified material, coming out of processor 10*z*, is mixed with the purified water, pushed with a constant pressure through networks of hoses 100, following the bottom of rivers, streams, and ditches to bring the fertilizer to the farmlands. The remaining water is destined to the forests and wild land through a parallel network of hoses 100.

To create ascending slopes whenever they are needed, the hoses 100 are installed on top of a pile 101. Floating valves 102, set at the top of elbow and Y connections 103, release the gas bubbles that might still be creating although the production cycle of gas is theoretically over. These elements are shown in FIGS. 16A, 16B, and 16C.

Since the ideal way to bring the putrescible material to the processors is by way of the sewage systems, the principle of an odorless waste disposer unit 300 is part of the invention. The waste disposer unit is illustrated in FIG. 17A to 17I.

Figure 17B:
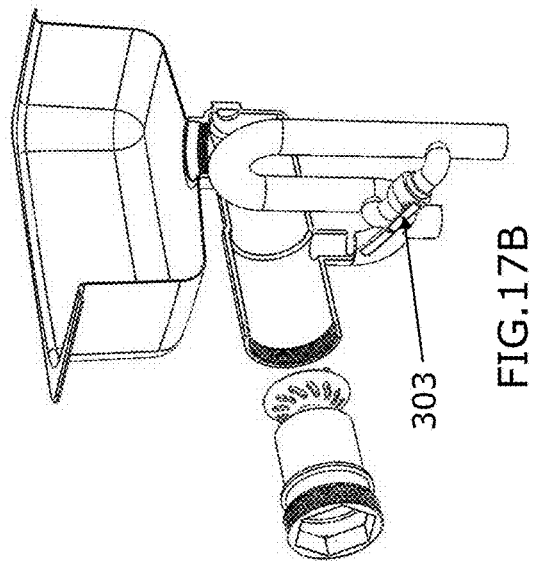
FIG. 17B is an exploded view of the waste disposer unit showing the bypass valve.
Figure 17D:
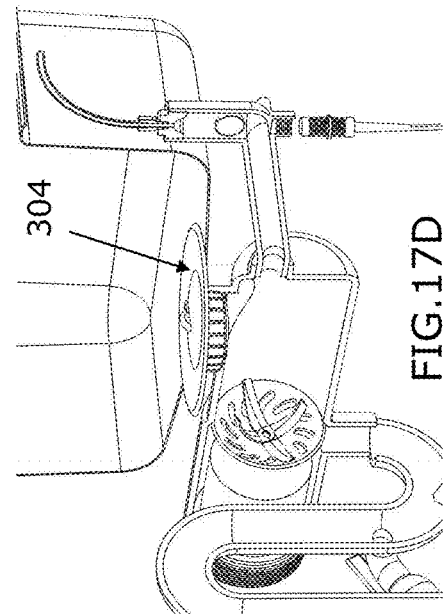
FIG. 17D is a perspective cut view similar to FIG. 17A showing the watertight plug.
Figure 17A:
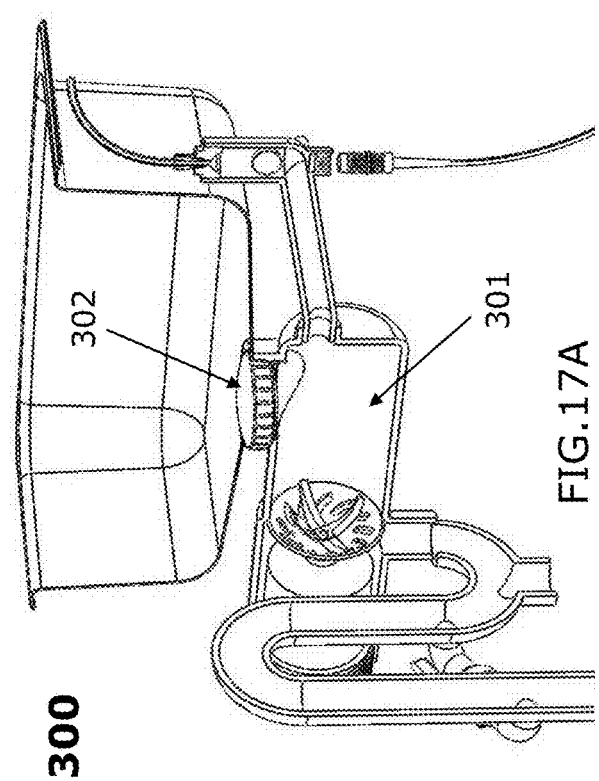
FIG. 17A is a perspective cut view of the waste disposer unit showing the chopping chamber.
Figure 17C:
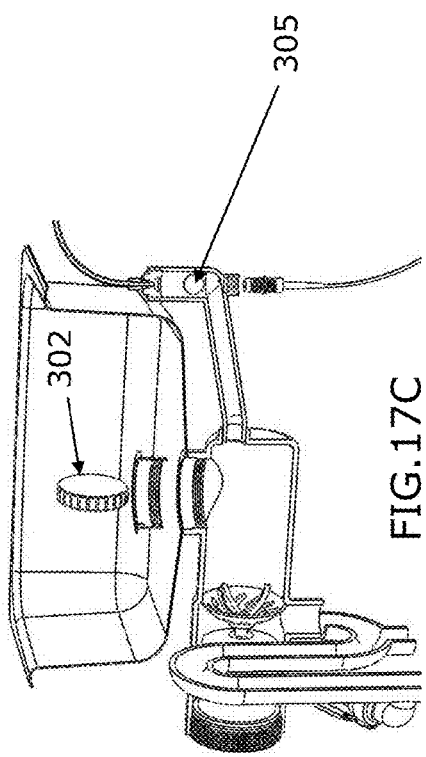
FIG. 17C is a perspective cut view of the waste disposer unit showing the swivel plug and the float.

In order to achieve the odorless grinding of waste material, the principle consists of the retention of water flooding the chopping chamber 301, establishing a ring of clean water around a swivel plug 302 from the ultimate flow of the tap (seen in FIG. 17A). The siphon that maintains the water level is equipped with a bypass valve 303 (seen in FIG. 17B) that allows complete drainage when maintenance is required. The plug 302 can be tilted and removed (seen in FIG. 17C) to facilitate the passing through of the objects. A watertight plug 304 (FIG. 17D) can be added over when one wishes to fill the sink.

A float 305 (shown in FIG. 17C) can be used to activate the mechanism when water accumulates in the sink.

Figure 17G:
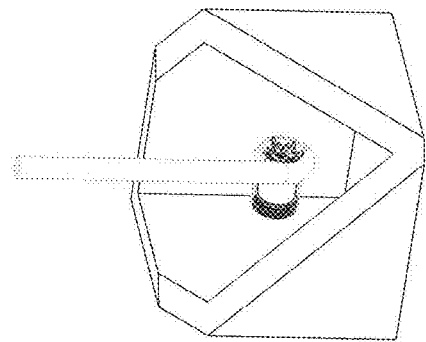
FIGS. 17E, 17F, and 17G show different embodiments of the waste disposer unit for industrial uses.
Figure 17I:
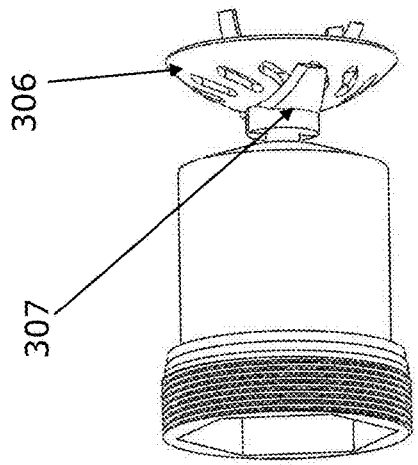
FIG. 17I shows a partial expanded view of the motor, the grid, and the back blade of the waste disposer unit for the purpose of pumping.
Figure 17F:
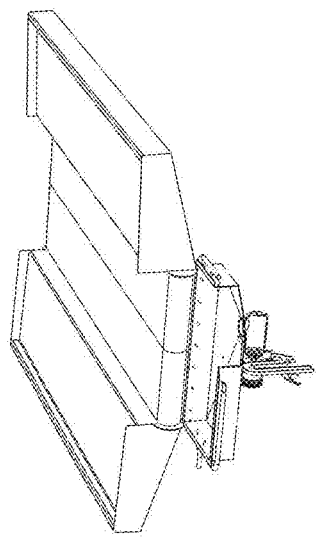
Figure 17E:
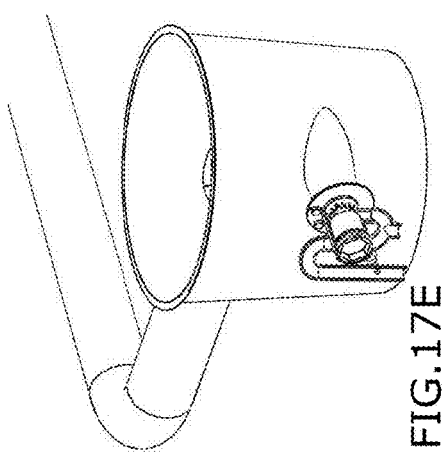
Figure 17H:
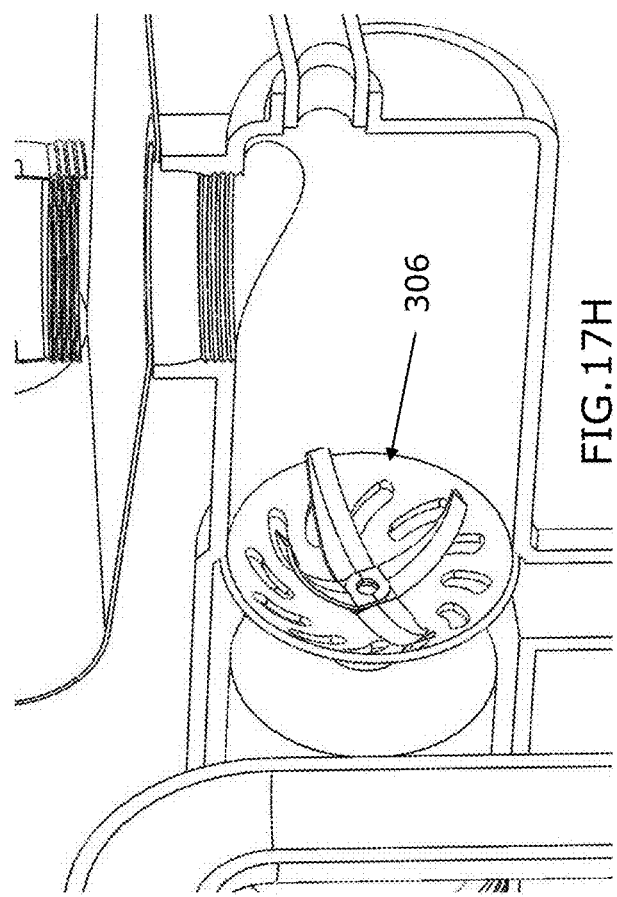
FIG. 17H shows a close-up sectional view of the waste disposer unit showing the grid.

This waste disposer unit can be fabricated in different sizes and adapted to commercial and industrial uses. A few possible embodiments are illustrated in FIGS. 17E, 17F, and 17G.

The waste disposer unit segments the objects by slicing them, or by tearing them up several times while they swirl in the water. This process of cutting and tearing continues until the material is reduced to fragments small enough to go through a conical grid 306 (shown in FIG. 17H and FIG. 17I).

Behind the conical grid, there may be one or several back blades 307 (seen in FIG. 17I); their cutting edges segment the particles coming through the openings of the grid 306. The tail edges of the blades rise apart as a propeller pitch to create a vortex to pump the material.

It will be understood that the above described embodiments are for purposes of illustration only, and that changes or modifications may be made thereto without departing from the spirit and scope of the invention.

The embodiments of the invention in which an exclusive property or privilege is claimed are defined as follows:

1. An apparatus for treatment and transformation of municipal wastewater sludge or other organic putrescible matter into biogas and liquid fertilizer by anaerobic digestion, said apparatus comprising a plurality of floating bioreactors consecutively arranged in series; wherein a first bioreactor initially processes wastewater sludge or other organic putrescible matter also wherein to remove sand, gravel or crushed glass; a series of middle bioreactors which process and digest the wastewater sludge or putrescible matter and a final bioreactor wherein the sludge or matter is further digested; wherein the final bioreactor includes means for measuring and monitoring the end of biogas production; said apparatus further comprising a heat exchanger for heating the sludge or matter for the destruction of harmful bacteria and pathogens; wherein each bioreactor comprising a longitudinal body to digest and provide methanation reaction of said sludge or matter within the bioreactor; each of said bioreactors further comprising a longitudinal inlet end, an inlet spout, located at a middle point of said longitudinal inlet end, connected to an inlet conduit by an inlet elbow, for purpose of receiving the matter into the bioreactor; said bioreactors further comprising a longitudinal outlet end, an outlet spout located at a middle point of said longitudinal outlet end, connected to an outlet conduit by an exhaust elbow for the purpose of exiting the matter from one bioreactor to the next bioreactor and from the last bioreactor at the end of the process, wherein pressure is created by retaining the biogas produced and wherein said floating bioreactors are almost totally immersed in warm water in a thermally insulated basin to maintain predetermined temperature for digestion and methanation conditions; wherein said bioreactors revolve on themselves by air ejected from a conduit disposed underneath said bioreactors, wherein said air is pumped into said conduits by air diaphragm pumps activated by the pressurized biogas; said air lodging in rotation buckets aligned as circular saw teeth outside the longitudinal body of the bioreactor, said air provoking a rotating action, mixing the contents; each of said bioreactors include mixing buckets aligned inside the body of the bioreactor; each of said bioreactors further comprise flotation rings located at the inlet and outlet of the bioreactor for counterbalancing the weight of the bioreactors and to provide buoyancy to the bioreactors so that the bioreactors remain horizontally disposed while floating; said apparatus further comprising a primary inlet pump, which is a dual hydraulic command diaphragm pump having a dual purpose, first to initiate and supply initial matter to be processed, and secondly, to drive said matter through the heat exchanger and squeeze the pressure created by heat against a first swivelling valve exhaust pump, said first swivelling valve exhaust pump working in combination with a last swivelling valve exhaust pump, both being two-diaphragm pumps having two functions: first to retain, control, and release the flow and pressure by transferring power hydraulically to the primary inlet pump, while the second function in which they differ, is that the first swivelling valve exhaust pump creates a vise action from the high pressure created from heating matter in the heat exchanger situated between said primary inlet pump and said first swivelling valve exhaust pump while the last swivelling valve exhaust pump retains the working pressure of the entire apparatus and transfers said pressure to the primary inlet pump from a closed-center hydraulic circuit that increases said pressure by the action of gas hydraulic pumps from each bioreactor, said closed-center hydraulic circuit comprising a shut-off valve that commands the last swivelling valve exhaust pump to operate and let consumed matter to escape when production of biogas is over, and a shut-off valve that commands the primary inlet pump to operate when new material is needed; said apparatus further comprising biogas pipes for the capture of biogas from the inside top portion of each bioreactor; wherein each of said bioreactors include a pressure relief valve to control the pressure in each bioreactor; said apparatus further including a plurality of hoses and conduits for the purpose of transporting fluids out of the bioreactor for the removal of fertilizers, juices and salts.

2. The apparatus of claim 1 wherein the first bioreactor is maintained at a thermophilic level of temperature, and wherein the middle bioreactors and last bioreactors are maintained at a mesophilic level of temperature.

3. The apparatus of claim 1, wherein each of said bioreactors further comprise a spiral channel situated inside the outlet end of said bioreactor to convey heavy matter from the bottom of the bioreactors through the outlet spouts.

4. The apparatus of claim 1 wherein the first bioreactor further comprising upright flat bars placed inside the body of said bioreactor under said mixing buckets forming a helical arrangement to move heavy unwanted matter from said bioreactor toward the outlet spout which can further include a spiral channel to improve transfer of material through the outlet.

5. The apparatus of claim 1, wherein the first bioreactor further comprises a lower port located at the exhaust elbow of the outlet conduit, said lower port in operative connection with a sinking reservoir for evacuating heavy material from said bioreactor to said sinking reservoir further comprising a valve controlling evacuation from the pressure of the bioreactor when said sinking reservoir reaches a predetermined low level.

6. The apparatus of claim 1 wherein the pressure of the biogas produced within the bioreactors is used to regulate the volume of the sludge contained in the bioreactors, pressurize the entire apparatus and provides power to activate a chain of mechanical motions for the functioning of said apparatus.

7. The apparatus of claim 1 wherein the last bioreactor includes a flow control valve in connection with a pressure valve to determine the end of biogas production and command the last swiveling valve exhaust pump to evacuate process material contained within the bioreactor and to allow new material to enter the apparatus.

8. The apparatus of claim 1, wherein the hoses and conduits connected to the last bioreactor by the last swiveling valve exhaust pump are constructed and arranged to deliver fluids from the reactors to farmlands as water and fertilizer.

9. The apparatus of claim 1 wherein the swiveling valve exhaust pumps further comprise a swiveling valve body of conic shape in order to use the working pressure as a sealing force, said swiveling valve further comprising two cross-directional tunnels matching two ports of a valve casing to drive pressure through one of the ports to fill a diaphragm to expand while drawing an opposite diaphragm to empty through a second cross-directional tunnel of said swiveling valve thereby creating a stroke action that generates hydraulic power because said stroke action transfers to an attached hydraulic piston, said swiveling valve turns, at the end of the stroke action, from a position of full opening to the ports of the valve casing, goes through a surface of total obstruction to arrive finally to a full opening of the opposite ports, driving the flow action in the reverse direction without losing any working pressure, said swiveling valve further comprising a rotation device that transfers a turning motion to balls disposed in-between conic holes of which a facing angle is perpendicular to the swiveling valve (41) taper edge, said balls serving to break the force by a shifting motion so that pressure keeps a gap closed while the valve turns without friction, and makes a back and forth half-rotation to prevent winding of unwanted material.

10. The apparatus of claim 1 further comprises rotary diaphragm pumps working by the action of a rotary valve functioning with a taper contact face ensuring a perfect sealing contact from entering pressure against a flange surrounding a body, said rotary diaphragm pumps receiving motion from the entering pressure driving through ports on one side, activating diaphragms of said rotary diaphragm pumps while releasing opposite diaphragms through ports on the opposite side, said rotary valve further comprising balls lodged in taper holes to apply a pushing force, acting against the friction of the taper contact when said rotary valve is in movement when the rotary diaphragm pump is in action, said rotary diaphragm pumps further comprising two diaphragm spiders related together by a bent shaft turning in their middle, rocking them, and activating diaphragms to pump consecutively.

11. The apparatus of claim 1 further comprises steam engines, the rotating energy of said steam engines powering generators to produce electricity, said steam engines comprising two rotary valves connected to diaphragm spiders where water is driven and pumped from smaller diaphragms of an inner circumference of said steam engines, the water sent to boil to steam, and directed through the second rotary valve, activating outer and bigger diaphragms of said steam engine.

12. The apparatus of claim 1 wherein the pressurized biogas dedicated to pressurize the whole apparatus, and activate several devices for the functioning of said apparatus, applies force as a cascade of decreasing pressure from one bioreactor to the next bioreactor to push sludge from one bioreactor to the next bioreactor, said pressurized biogas applying force to activate air diaphragm pumps, rotary diaphragm pumps and hydraulic pumps, said hydraulic pumps add hydraulic pressure to the closed-center hydraulic circuit.

13. The apparatus of claim 1 wherein the heat exchangers comprise coil scrapers inside tubes of said heat exchangers to remove any sticking matter from said tubes.

\* \* \* \* \*